United States Patent [19]
Gahang

[11] Patent Number: 5,898,800
[45] Date of Patent: Apr. 27, 1999

[54] PIXEL BINARIZATION DEVICE AND METHOD FOR IMAGE PROCESSING SYSTEM

[75] Inventor: Goo-Soo Gahang, Seoul, Rep. of Korea

[73] Assignee: SamSung Electronics Co., Ltd., Suwon, Rep. of Korea

[21] Appl. No.: 08/664,913

[22] Filed: Jun. 17, 1996

[30] Foreign Application Priority Data

Jun. 17, 1995 [KR] Rep. of Korea ...................... 95-16170

[51] Int. Cl.⁶ .................................................. G06K 9/40
[52] U.S. Cl. .......................................... 382/270; 382/223
[58] Field of Search ................................... 358/465–466, 358/456–459, 429; 382/270–275, 260–262

[56] References Cited

U.S. PATENT DOCUMENTS

| | | | |
|---|---|---|---|
| 4,578,713 | 3/1986 | Tsao et al. .............................. | 358/283 |
| 4,833,723 | 5/1989 | Loveridge et al. ..................... | 382/273 |
| 4,999,629 | 3/1991 | Katsuta .................................. | 351/155 |
| 5,029,226 | 7/1991 | Klein et al. ............................ | 382/50 |
| 5,068,909 | 11/1991 | Rutherford et al. ................... | 382/273 |
| 5,153,925 | 10/1992 | Tanioka et al. ........................ | 382/52 |
| 5,157,740 | 10/1992 | Klein et al. ............................ | 358/466 |
| 5,208,873 | 5/1993 | Nakajima .............................. | 382/50 |
| 5,268,773 | 12/1993 | Park et al. ............................. | 358/466 |
| 5,341,224 | 8/1994 | Eschback .............................. | 358/456 |
| 5,583,659 | 12/1996 | Lee et al. ............................... | 382/270 |
| 5,600,732 | 2/1997 | Ott et al. ............................... | 382/112 |

*Primary Examiner*—David K. Moore
*Assistant Examiner*—Stephen Brinich
*Attorney, Agent, or Firm*—Robert E. Bushnell, Esq.

[57] ABSTRACT

The present invention relates to an image processing apparatus, and more particularly, to a device and method capable of binarizing pixels by removing an isolated point. The pixel binarization method contemplates the steps of: establishing a local window of pixels including a central pixel and a plurality of neighboring pixels; analyzing the neighboring pixels within the local window and detecting a minimum brightness value and a maximum brightness value exhibited by the neighboring pixels; comparing a brightness value exhibited by the central pixel with the minimum brightness value; and determining the central pixel to be an isolated point and outputting the central pixel as a white pixel when the brightness value exhibited by the central pixel is less than the minimum brightness value.

12 Claims, 3 Drawing Sheets

PIXEL BINARIZATION DEVICE AND METHOD FOR IMAGE PROCESSING SYSTEM

CROSS-REFERENCE TO RELATED APPLICATIONS

This application makes reference to, incorporates the same herein, and claims all benefits accruing under 35 U.S.C. §119 arising from an application for Pixel Binarization Device And Method For Image Processing System earlier filed in the Korean Industrial Property Office on Jun. 17, 1995 and there duly assigned Ser. No. 16170/1995.

BACKGROUND OF THE INVENTION

The present invention relates to an image processing apparatus, and more particularly, to a device and method for binarizing pixels by removing isolated points.

Generally, an image processing system, such as a facsimile machine, compares a mean brightness value of local pixels with a brightness value of a central pixel to determine the logic state in which a pixel is binarized. A binarization method of this type is disclosed in Korean Patent No. 93-3484, assigned to the same assignee as the present invention. This type of method is used in a facsimile machine for improving character readability by emphasizing edge regions in consideration of a brightness characteristic of local pixels. Such a method, however, applies uniform threshold values without consideration of the quality of the document being processed. Therefore, when documents of normal quality are processed, character readability can be improved. When documents of poor quality are processed, however, isolated black dots (i.e., isolated points) are generated on the white background of the document. In particular, when there is only a slight difference in brightness between the edges of the image and the white background of the document, in order for these edges to be cleanly displayed as black lines, the threshold value must be reduced. For example, when pixels exhibit 16 different levels of brightness, wherein level 16 represents a brightest level and level 1 represents a darkest level, the threshold value should be set to represent either level 1 or level 2. Doing this, however, creates a problem in that the possibility of generating undesired isolated points increases. The present invention is directed towards solving this problem.

SUMMARY OF THE INVENTION

Accordingly, it is an object of the present invention to provide an improved device and method for binarizing pixels.

It is another object to provide a device and method capable of binarizing pixels by removing isolated points generated on a white background of a document in an image processing system.

It is still another object to provide a device and method capable of binarizing pixels by analyzing local pixels and removing two or less isolated points in an image processing system.

To achieve these and other objects, the present invention provides a pixel binarization method for an image processing system. By establishing a local window of pixels comprised of a central pixel and a plurality of neighboring pixels; analyzing the neighboring pixels within the local window and detecting a minimum brightness value and a maximum brightness value exhibited by the neighboring pixels; comparing a brightness value exhibited by the central pixel with the minimum brightness value; and determining the central pixel to be an isolated point and outputting the central pixel as a white pixel when the brightness value exhibited by the central pixel is less than the minimum brightness value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, various terms are used to describe specific aspects of the present invention. These terms will now be defined to provide an enhanced understanding of the present invention.

The term "isolated point" indicates a pixel that is represented as a black dot, but should actually be represented as a white dot requiring no application of toner or developing material. The term "threshold value" represented as Tdiff, and the term "reference pixel value" represented as Tglobal, are values used in performing the pixel binarization method of the present invention. Assuming that a single pixel is represented by 4 bits of data indicating 16 different brightness levels with level 16 being the brightest level and level 1 being the darkest level, the threshold value Tdiff is typically set to level 1 or 2 and the reference pixel value Tglobal is typically set to level 8. It should be noted, however, that these set levels can be varied. The term "central pixel" indicates a pixel positioned in the center of a selected window. Binarization of the central pixel is based on brightness levels of the eight neighboring pixels within the window that are positioned around the central pixel.

In the present invention, the image processing system which scans a document image is exemplified by a facsimile system.

Figure 1:
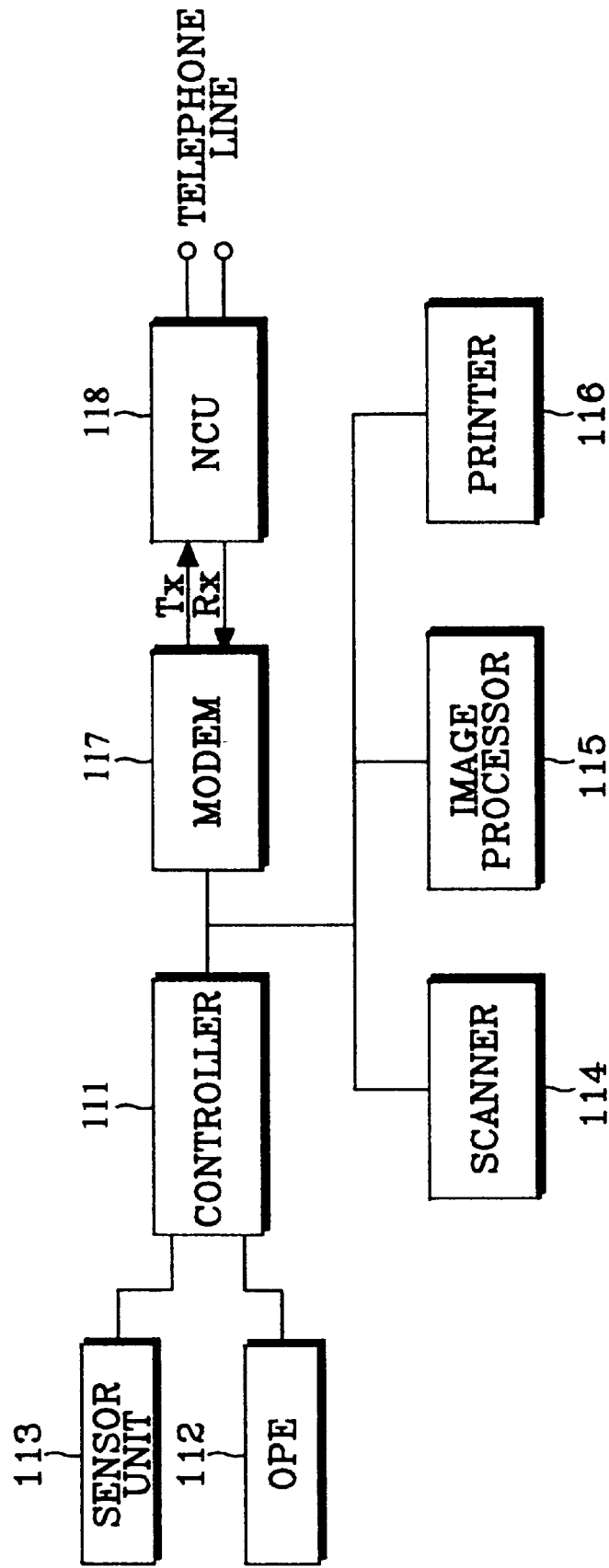
FIG. 1 is a block diagram illustrating a facsimile system constructed according to the principles of the present invention.

Turning now to the drawings and referring to FIG. 1, a block diagram of a facsimile system constructed according to the principles of the present invention is shown. In FIG. 1, a controller 111 controls a transmission mode, reception mode, and copy mode of the facsimile system according to a predetermined program. Controller 111 may include a built-in program memory and data memory, or may be externally connected to these memories. The program memory stores the program necessary for performing the present invention, and the data memory temporarily stores data generated during execution of the program. An operating panel OPE 112 comprises a key input unit and a display unit. The key input unit of OPE 112 generates data corresponding to keys pressed by a user for setting and executing each mode, and provides output of this data to controller 111. The display unit of OPE 112 receives data indicating an operating status of the facsimile system, and provides display of the data upon the execution of each mode. A sensor unit 113 senses whether or not a document is input and recording sheets are fed, and outputs a status signal to controller 111. A scanner 114 scans an image borne upon the document, and converts the scanned data into digital image data. An image processor 115 processes the digital image data output from scanner 114 during the transmission mode and the copy mode, and processes image data received through a telephone line under the control of controller 111 during the reception mode. Image processor 115 encodes image data in conformance with the requirements of the facsimile system, and also decodes received image data to recover original image data. A printer 116 prints image data received from image processor 115 on recording sheets, such as paper, during the reception and copy modes under the control of controller 111. A modulator-demodulator MODEM 117 generates modulated image data by modulating image data received from image processor 115, and transmits this modulated image data during the transmission mode under the control of controller 111. Modulator-demodulator MODEM 117 also generates demodulated image data by demodulating image data received during the reception mode, and provides this demodulated image data to image processor 115 for processing. A network control unit NCU 118 establishes a transmission and reception path between the telephone line and modulator-demodulator MODEM 117 under the control of controller 111.

Figure 2:
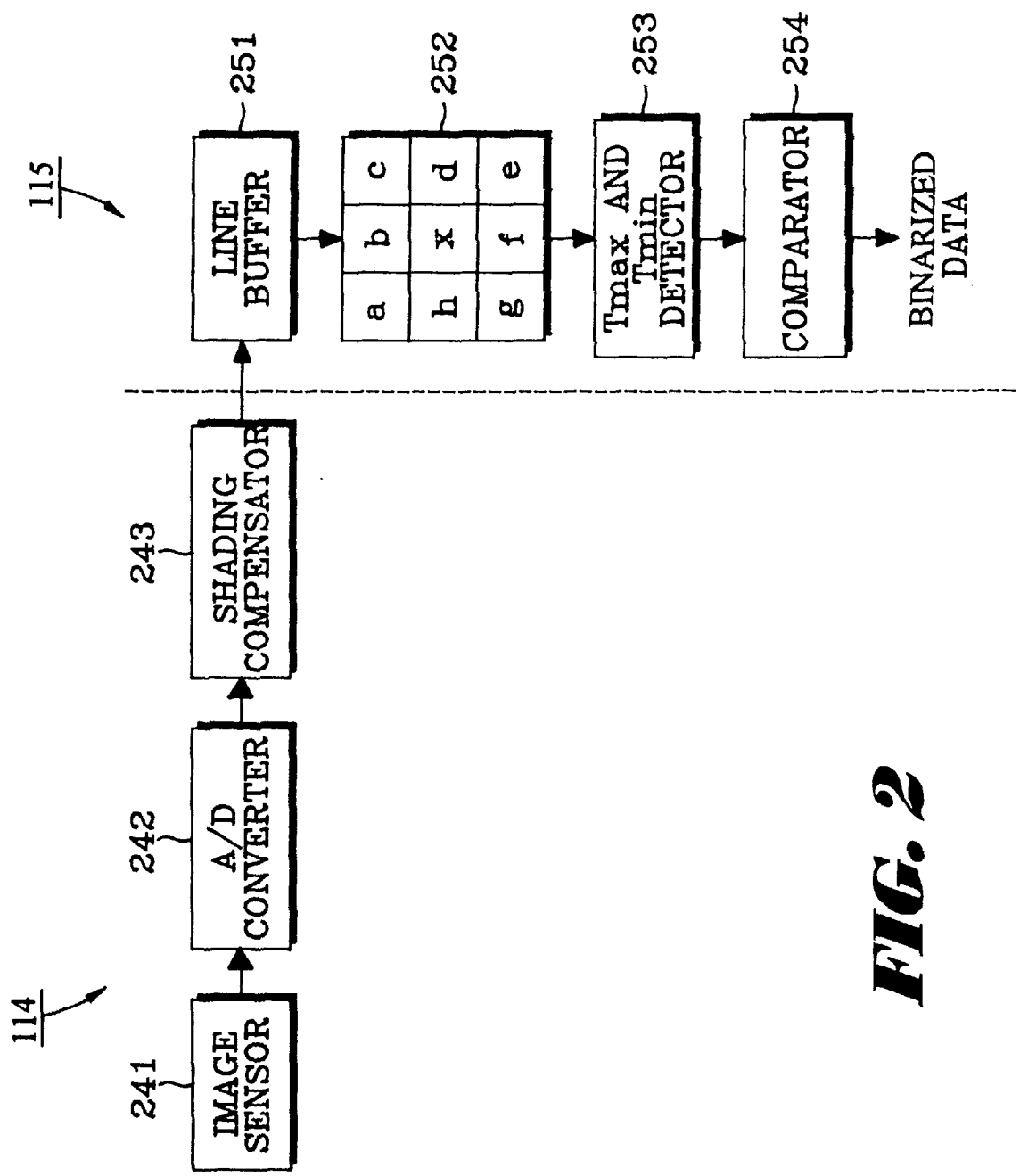
FIG. 2 is a block diagram illustrating details of the components in FIG. 1 that execute the method of binarizing pixels according to the principles of the present invention.

FIG. 2 is a block diagram illustrating details of the components in FIG. 1 that execute the method of binarizing pixels according to the principles of the present invention. In particular, FIG. 2 illustrates the details of scanner 114 and image processor 115 shown in FIG. 1. In FIG. 2, scanner 114 includes an image sensor 241, an analog-to-digital (A/D) converter 242 and a shading compensator 143. Image processor 115 includes a line buffer 251, a window register 252, a Tmax and Tmin detector 253 and a comparator 254.

Image sensor 241 scans an image borne upon the surface of a document, and generates electrical signals representative of the image. Image sensor 241 may be embodied as a charge-coupled device CCD sensor or a contact image sensor CIS. Analog-to-digital A/D converter 242 converts analog image signals output from image sensor 241 into digital image data for output. Shading compensator 243 compensates for dispersion of the image data due to differences in the intensity distribution of light scanned during scanning of the document image, or differences in sensitivity among any of the sensing elements of image sensor 241.

Image data output from shading compensator 243 is stored in line buffer 251, which stores 2 or 3 lines of image data. Herein, assume that 4 bits of image data stored in line buffer 251 represent a single pixel. Window register 252 locally reads pixels from 3 lines of image data stored in line buffer 251, and stores the read pixels. Window register 252 comprises nine 4-bit registers, and is controlled by a controller of image processor 115 (which is not shown in the figures, and is hereinafter referred to as an image controller). The reference character x within window register 252 represents the central pixel, and reference characters a–h represent neighboring pixels positioned in the eight directions around the central pixel x. That is, window register 252 establishes a 3×3 local mask that isolates the central pixel x and the neighboring pixels a–h. The central pixel x and the neighboring pixels a–h of window register 252 are represented in the following <Table 1>, wherein (i,j) represents the central pixel x.

<TABLE 1>

| (i − 1, j − 1) | (i − 1, j) | (i − 1, j + 1) |
|---|---|---|
| (i, j − 1) | (i, j) | (i, j + 1) |
| (i + 1, j − 1) | (i + 1, j) | (i + 1, j + 1) |

Tmax and Tmin detector 253 receives an output provided from window register 252, and compares brightness values of neighboring pixels a–h (excluding the central pixel x), to thereby detect the maximum brightness value (i.e., Tmax) and the minimum brightness value (i.e., Tmin) of the neighboring pixels a–h positioned within the window. Accordingly, Tmax and Tmin detector 253 comprises a Tmax detector and a Tmin detector, and each detector comprises a plurality of comparators.

Comparator 254 is provided with the threshold value Tdiff and the reference pixel value Tglobal as reference data for a comparison, and is also provided with a value equal to Tmax−Tmin and an operator of (Tmax+Tmin)/2 for generating a mean local value Tavg as comparison data. When the brightness value of the central pixel x is less than the minimum brightness value Tmin of the neighboring pixels a–h within the window, comparator 254 determines that the central pixel x is a first isolated point, and accordingly binarizes the central pixel x to represent a white pixel. Moreover, when the brightness value of the central pixel x is equal to the minimum brightness value Tmin of the neighboring pixels a–h within the window, and only one of the neighboring pixels exhibits a brightness value equal to the minimum brightness value Tmin, comparator 254 determines that the central pixel x is a second isolated point, and accordingly binarizes the central pixel x to represent a white pixel. Further, when the value exhibited by the difference Tmax−Tmin is less than the threshold value Tdiff, comparator 254 compares the brightness value of the central pixel x with the reference pixel value Tglobal. In this situation, if the brightness value of the central pixel x is greater than or equal to the reference pixel value Tglobal, the central pixel x is binarized to represent a white pixel, and if the brightness value of the central pixel x is less than the reference pixel value Tglobal, the central pixel x is binarized to represent a black pixel.

Figure 3:
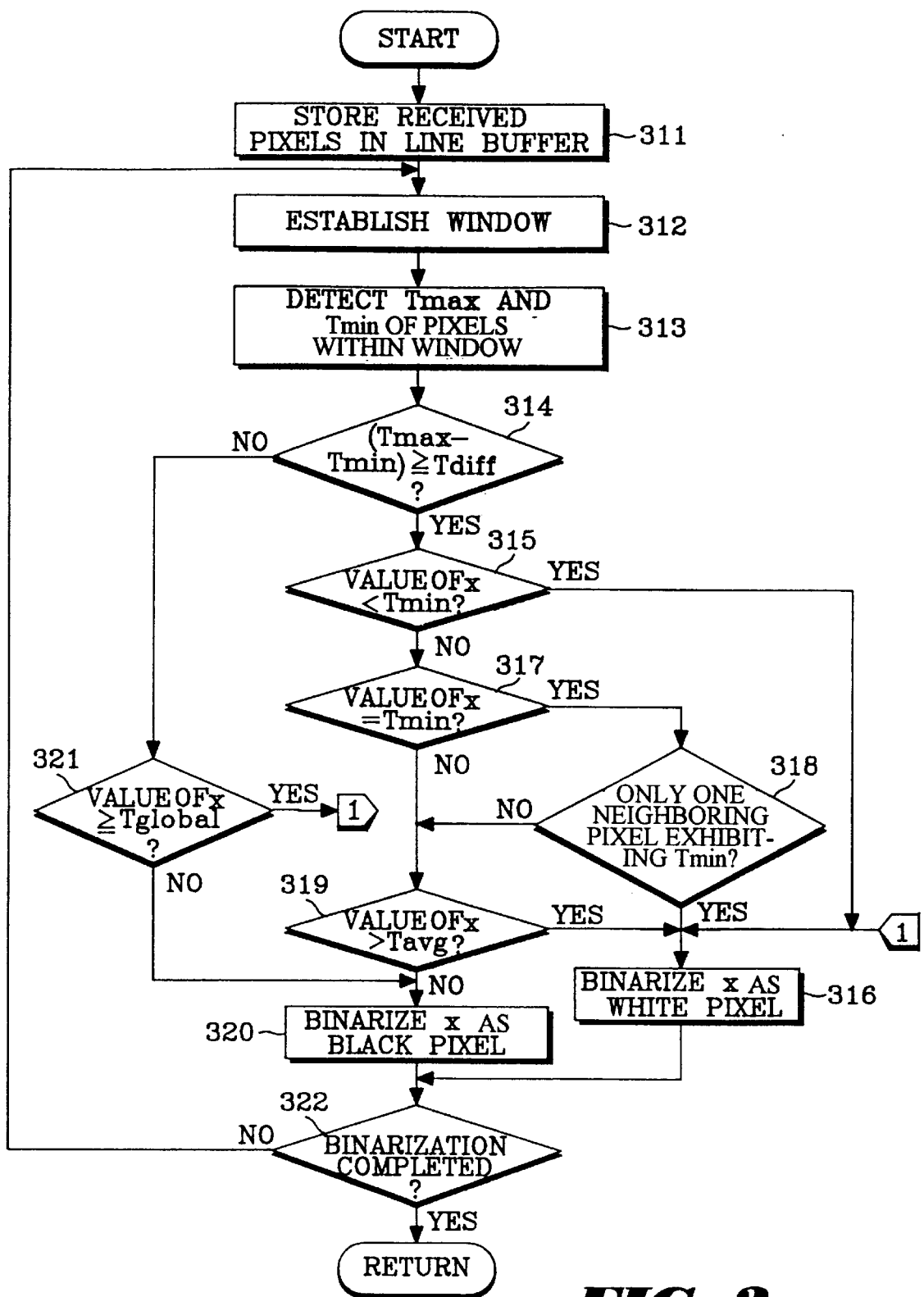
FIG. 3 is a flow chart illustrating the method of binarizing pixels in an image processing system constructed according to the principles of the present invention.

FIG. 3 is a flow chart illustrating the method of binarizing pixels in an image processing system constructed according to the principles of the present invention. In the image processing system of the present invention, image processor 115 determines whether or not any isolated points exist upon printing of the pixels, and if any pixel is determined to represent an isolated point, that pixel is binarized as a white pixel so that the isolated point is not printed. Accordingly, when the brightness value of the central pixel x is less than the minimum brightness value Tmin of the neighboring pixels a–h within the window, image processor 115 determines that the central pixel x is a first isolated point and then binarizes the central pixel x as a white pixel. According to an experiment, these first isolated points represent approximately 70% to 80% of the isolated points that are generated. Furthermore, when the brightness value of the central pixel x is equal to the minimum brightness value Tmin of the neighboring pixels a–h and only one of the neighboring pixels a–h exhibits the minimum brightness value Tmin, then two isolated points are determined to exist within the window, and image processor 115 determines that the central pixel x is the second isolated point and accordingly binarizes the central pixel x as a white pixel. According to the experiment, these second isolated points represent up to 20% of the isolated points that are generated. In the present invention, if the difference exhibited by Tmax–Tmin is less than the threshold value Tdiff, image processor 115 compares the brightness value of the central pixel x with the reference pixel value Tglobal. If the brightness value of the central pixel x is greater than or equal to the reference pixel value Tglobal, the central pixel x is binarized to represent a white pixel, and if the brightness value is less than the reference pixel value Tglobal, the central pixel x is binarized to represent a black pixel. When there is little difference between Tmax and Tmin of the neighboring pixels a–h positioned within the window, image processor 115 compares the brightness value of the central pixel x with the reference pixel value Tglobal, which represents an intermediate level of brightness, and then binarizes the central pixel x. As described above, assuming that the pixels can represent 16 different brightness levels with level 16 being the brightest level and level 1 being the darkest level, the threshold value Tdiff is preferably set to level 1 or 2 and the reference pixel value Tglobal is preferably set to level 8.

Referring to FIGS. 2 and 3, the method of binarizing pixels in an image processing system constructed according to the principles of the present invention will now be described.

In step 311, lines of pixels output from scanner 114 are received by image processor 115, and the lines of received pixels are stored in line buffer 251. During this step, line buffer 251 stores two or three lines of pixels. In step 312, a local window is established as indicated by the pixel designations shown in Table 1. Accordingly, the local window is composed of the central pixel x and the neighboring pixels a–h positioned in the eight directions around the central pixel x. In step 313, brightness values of the neighboring pixels a–h positioned within the window (excluding the central pixel x) are compared and analyzed so that the minimum and maximum brightness values Tmin and Tmax are detected.

In step 314, the value exhibited by the difference Tmax–Tmin is compared with the threshold value Tdiff When the value Tmax–Tmin is less than the threshold value Tdiff, this indicates that there is little difference among the brightness values of the pixels within the window and therefore, the image controller (not shown) proceeds to step 321 to perform the binarization process. In step 321, the brightness value of the central pixel x and the reference pixel value Tglobal are compared. When the brightness value of the central pixel x is less than the reference pixel value Tglobal, the central pixel x is binarized as a black pixel in step 320. Alternatively, when the brightness value of the central pixel x is greater than or equal to the reference pixel value Tglobal, the central pixel is binarized as a white pixel in step 316.

When the value exhibited by the difference Tmax–Tmin is greater than or equal to the threshold value Tdiff in step 314 however, the image controller determines whether or not the central pixel x is an isolated point. First, in step 315, the brightness value of the central pixel x and the minimum brightness value Tmin are compared. When the brightness value of the central pixel x is less than the minimum brightness value Tmin, the central pixel x exhibits a brightness value indicating that it is actually a black pixel, but the central pixel x is determined to be the first isolated point, and is accordingly binarized as a white pixel in step 316. When the central pixel x is determined to be the first isolated point, this indicates that the central pixel x is the darkest pixel among the pixels positioned within the window, and also indicates that only one isolated point exists within the window.

Referring back to step 315, when the brightness value of the central pixel x is not less than the minimum brightness value Tmin, the image controller determines whether or not the brightness value of the central pixel x is equal to the minimum brightness value Tmin. If the brightness value of the central pixel x is equal to the minimum brightness value Tmin, the image controller determines whether or not only one of the neighboring pixels a–h within the window exhibits a brightness value equal to the minimum brightness value Tmin in step 318. Then, if only one of the neighboring pixels a–h exhibits a brightness value equal to the minimum brightness value Tmin, the image controller determines that the central pixel x is the second isolated point, and accordingly binarizes the central pixel x as a white pixel in step 316. When the central pixel x is determined to be the second isolated point, this indicates that the brightness value of the central pixel x is equal to the minimum brightness value Tmin and only one of the neighboring pixels a–h positioned within the window exhibits a brightness value equal to the minimum brightness value Tmin. This also indicates that two isolated points exist within the window; namely, the central pixel x and one of the neighboring pixels a–h.

On the other hand, if the brightness value of the central pixel x is greater than the minimum brightness value Tmin in step 317, or although the brightness value of the central pixel x is equal to the minimum brightness value Tmin in step 317, if two or more of the neighboring pixels a–h exhibiting a brightness value equal to the minimum brightness value Tmin exist within the window in step 318, the image controller compares the brightness value of the central pixel x with the mean local value Tavg in step 319. Herein, the mean local value Tavg is obtained by the expression (Tmax+Tmin)/2. When the brightness value of the central pixel x is greater than the mean local value Tavg, the central pixel x is binarized as a white pixel in step 316. Alternatively, when the brightness value of the central pixel x is not greater than the mean local value Tavg, the central pixel x is binarized as a black pixel in step 320.

Then, after the binarization of one line of pixels stored in line buffer 251 is completed in step 322, the image controller returns for the binarization of the pixels of the next line. On the other hand, if the binarization is not completed in step 322, the method proceeds back to step 312 and the operations described above are repeatedly performed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. A pixel binarization method for an image processing system, comprising the steps of:

establishing a local window of pixels comprised of a central pixel and a plurality of neighboring pixels;

analyzing said neighboring pixels within said window and detecting a minimum brightness value and a maximum brightness value exhibited by said neighboring pixels;

comparing a brightness value exhibited by said central pixel with said minimum brightness value;

determining said central pixel to be a first isolated point and outputting said central pixel as a white pixel when said brightness value exhibited by said central pixel is less than said minimum brightness value;

determining said central pixel to be a second isolated point and outputting said central pixel as said white pixel when said brightness value exhibited by said central pixel is equal to said minimum brightness value and only one of said neighboring pixels exhibits said minimum brightness value;

comparing said brightness value of said central pixel with a mean local value when said brightness value exhibited by said central pixel is greater than said minimum brightness value;

outputting said central pixel as said white pixel when said brightness value exhibited by said central pixel is greater than said mean local value; and outputting said central pixel as a black pixel when said brightness value exhibited by said central pixel is not greater than said mean local value.

2. The pixel binarization method as claimed in claim 1, wherein said mean local value is equal to a sum of said maximum brightness value and said minimum brightness value divided by two.

3. The pixel binarization method as claimed in claim 2, wherein said neighboring pixels are respectively positioned in eight different directions around said central pixel.

4. A pixel binarization method for an image processing system, comprising the steps of:

establishing a local window of pixels comprising a central pixel and a plurality of neighboring pixels;

analyzing said neighboring pixels within said window and detecting a minimum brightness value and a maximum brightness value exhibited by said neighboring pixels;

subtracting said minimum brightness value from said maximum brightness value to generate a subtractive value, and comparing said subtractive value with a threshold value;

comparing a brightness value exhibited by said central pixel with a reference pixel value when said subtractive value is less than said threshold value;

processing said central pixel as a white pixel when said brightness value exhibited by said central pixel is greater than or equal to said reference pixel value, and processing said central pixel as a black pixel when said brightness value exhibited by said central pixel is less than said reference pixel value;

comparing said brightness value exhibited by said central pixel with said minimum brightness value when said subtractive value is greater than or equal to said threshold value;

determining said central pixel to be a first isolated point and processing said central pixel as said white pixel when said brightness value exhibited by said central pixel is less than said minimum brightness value;

determining said central pixel to be a second isolated point and processing said central pixel as said white pixel when said brightness value exhibited by said central pixel is equal to said minimum brightness value and only one of said neighboring pixels exhibits said minimum brightness value;

comparing said brightness value exhibited by said central pixel with a mean local value when either said brightness value exhibited by said central pixel is greater than said minimum brightness value or said brightness value exhibited by said central pixel is equal to said minimum brightness value and more than one of said neighboring pixels exhibit said minimum brightness value;

processing said central pixel as said white pixel when said brightness value exhibited by said central pixel is greater than said mean local value; and processing said central pixel as said black pixel when said brightness value exhibited by said central pixel is not greater than said mean local value.

5. The pixel binarization method as claimed in claim 4, further comprised of said central pixel and said neighboring pixels each being represented by 4 bits of data indicating 16 different levels of brightness, wherein level 16 indicates a brightest level and level 1 indicates a darkest level.

6. The pixel binarization method as claimed in claim 5, wherein said threshold value is set to said level 1 or to level 2, and said reference pixel value is set to 8 level.

7. The pixel binarization method as claimed in claim 6, wherein said mean local value is equal to a sum of said maximum brightness value and said minimum brightness value divided by two.

8. The pixel binarization method as claimed in claim 7, wherein said neighboring pixels are respectively positioned in eight directions around said central pixel.

9. A pixel binarization method for an image processing system, comprising the steps of:

establishing a local window of pixels comprised of a central pixel and a plurality of neighboring pixels;

analyzing said neighboring pixels within said window and detecting a minimum brightness value and a maximum brightness value exhibited by said neighboring pixels;

subtracting said minimum brightness value from said maximum brightness value to generate a subtractive value, and comparing said subtractive value with a threshold value;

comparing a brightness value exhibited by said central pixel with said minimum brightness value when said subtractive value is greater than or equal to said a threshold value;

determining said central pixel to be a first isolated point and outputting said central pixel as a white pixel when said brightness value exhibited by said central pixel is less than said minimum brightness value;

determining said central pixel to be a second isolated point and outputting said central pixel as said white pixel when said brightness value exhibited by said central pixel is equal to said minimum brightness value and only one of said neighboring pixels exhibits said minimum brightness value;

comparing said brightness value of said central pixel with a mean local value when said brightness value exhibited by said central pixel is greater than said minimum brightness value;

outputting said central pixel as said white pixel when said brightness value exhibited by said central pixel is greater than said mean local value; and outputting said central pixel as a black pixel when said brightness value exhibited by said central pixel is not greater than said mean local value.

10. The pixel binarization method as claimed in claim 9, wherein said mean local value is equal to a sum of said maximum brightness value and said minimum brightness value divided by two.

11. The pixel binarization method as claimed in claim 9, wherein said neighboring pixels are respectively positioned in eight directions around said central pixel.

12. The pixel binarization method as claimed in claim 10, wherein said neighboring pixels are respectively positioned in eight directions around said central pixel.

* * * * *